(No Model.)
J. J. POWERS.
AUTOMATIC RATCHET COCK.
No. 408,431. Patented Aug. 6, 1889.
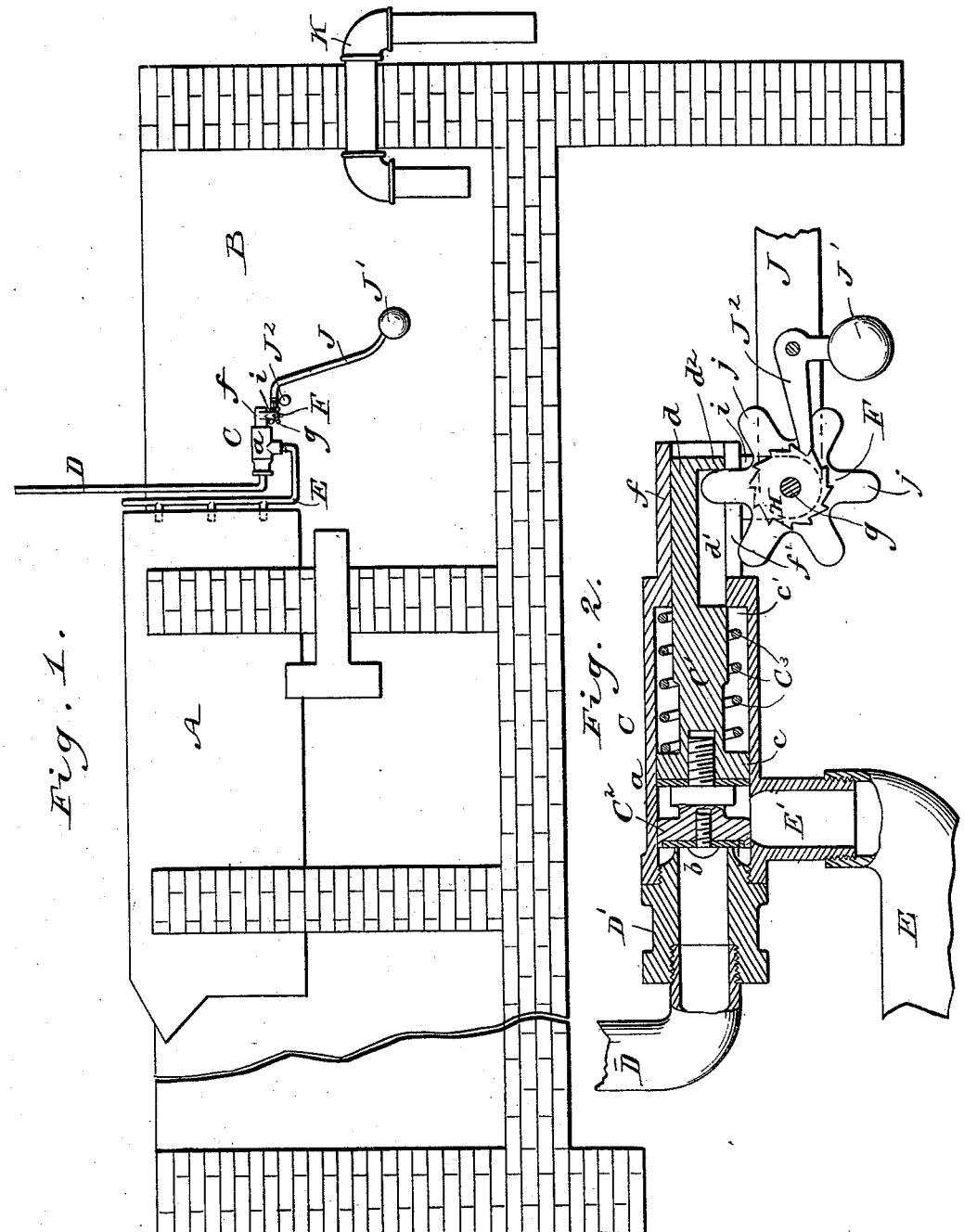
WITNESSES:
INVENTOR:
J. J. Powers
BY Munn & Co.
ATTORNEYS.

UNITED STATES PATENT OFFICE.

JAMES J. POWERS, OF BROOKLYN, NEW YORK.

AUTOMATIC RATCHET-COCK.

SPECIFICATION forming part of Letters Patent No. 408,431, dated August 6, 1889.

Application filed April 11, 1889. Serial No. 306,818. (No model.)

*To all whom it may concern:*

Be it known that I, JAMES J. POWERS, of Brooklyn, in the county of Kings and State of New York, have invented a new and Improved Automatic Ratchet-Cock, of which the following is a full, clear, and exact description.

My invention relates to a cock designed to effect or permit an intermittent flow and be perpetual in its action; and the invention consists of a combined pivoted arm or float and ratchet device to act in connection with a suitable wheel for operating the valve.

The invention also consists in the construction, arrangement, and combination of parts, all as hereinafter described and claimed.

Reference is to be had to the accompanying drawings, forming a part of this specification, in which similar letters of reference indicate corresponding parts in both the figures.

Figure 1 shows in side elevation one application of my invention, and Fig. 2 is an enlarged sectional elevation of the cock.

My invention is applicable, with changes in proportions and form, to various situations, but is designed more particularly for use in connection with my new automatic disinfecting sewage-tank, for which Letters Patent have been allowed to me, application No. 289,170, allowed March 20, 1889.

A is a box for lime or other substance and designed to be flushed at intervals, depending upon the flow or amount of liquid in the tank B. For controlling the flow I employ my new ratchet-cock C, which connects the head or supply pipe D with the inlet-pipe E. The cock is formed of a suitable casing $a$, provided with a valve rest or seat $b$ intervening between the adjacent ends or couplings D' E' of the pipes D E. In the casing $a$ is fitted the valve C', provided with a head $C^2$ and acted upon by a spring $C^3$, which normally forces the head $C^2$ against the seat $b$ past the coupling E', thus preventing all flow through the cock. The spring $C^3$ acts between the shoulder $c$ of the valve and the offset $c'$ of the casing, as shown in Fig. 2. The rear end of the valve C' is extended, as shown at $d$, and slotted at $d'$ or otherwise shaped to form the projection $d^2$. The said extension $d$ is contained in the hollow extension $f$ of the main casing, which is open at its rear end and slotted at $f'$ to coincide with the slot $d'$ in the valve C'. On the pin $g$, held in suitable supports $i$, connected, by preference, to the extension $f$, is journaled the star-wheel F, the projections $j$ of which are adapted to come in contact with the projection $d^2$. At one of its sides the wheel F is formed with the ratchet-wheel H. On the same pin $g$, or, if desired, on another pin, is pivoted the lever or arm J, which is provided at its outer end with the float J' and near the wheel with the pawl $J^2$, which is held by a weight or other means in engagement with the teeth of the ratchet-wheel H.

The operation is as follows: As liquid enters the tank B (which for the action of the device may be of any size, form, and purpose) the float J' will be lifted and the lever or arm J turned on its pivot and the pawl $J^2$ carried up the ratchet-wheel H. Now, if the liquid in the tank B is withdrawn by the siphon K or otherwise, the arm J and float J' will of their own weight turn the ratchet-wheel H and the star-wheel F, causing one of the projections $j$ of the latter wheel to draw back the valve C', thus opening the supply-pipe D into the pipe E, whereupon water will enter the tank A, and the water will flow until the projection of the star-wheel passes the projection $d^2$ of the valve, whereupon the spring $C^3$ will close the valve. When the liquid rises in the tank B again and is again withdrawn, the action of the cock will be repeated.

Having thus described my invention, what I claim as new, and desire to secure by Letters Patent, is—

1. The combination, with the plug or valve of the cock, of a lever, pawl and ratchet, and a star-wheel arranged to withdraw the cock or plug, substantially as described.

2. The main casing $a$, having inlet and outlet connections, and a valve-seat $b$, and the spring-actuated cock or plug C', having the projection $d^2$, in combination with the star-wheel F, ratchet-wheel H, lever J, and pawl $J^2$, all arranged to operate substantially as described.

JAMES J. POWERS.

Witnesses:
H. A. WEST,
C. SEDGWICK.